J. A. HEAD.
TRUCK.
APPLICATION FILED JULY 13, 1917.

1,243,063.

Patented Oct. 16, 1917.

Inventor
Joseph A. Head

Witness
By
Attorney

UNITED STATES PATENT OFFICE.

JOSEPH A. HEAD, OF FRUITDALE, OHIO, ASSIGNOR OF ONE-HALF TO J. W. BLAIR, OF JOHNSTOWN, OHIO.

TRUCK.

1,243,063.  Specification of Letters Patent.  Patented Oct. 16, 1917.

Application filed July 13, 1917.  Serial No. 180,275.

*To all whom it may concern:*

Be it known that I, JOSEPH A. HEAD, a citizen of the United States, residing at Fruitdale, in the county of Ross and State of Ohio, have invented certain new and useful Improvements in Trucks, of which the following is a specification.

This invention relates to trucks and is particularly directed as an improvement in trucks or vehicles used in transporting shocks of corn from place to place or it may be used to transport trees and the like from place to place.

The main object of my invention resides in the combination with a truck which may be swung from a horizontal to a vertical position or vice versa, of a draft connection attached thereto, but which is automatically adjustable to shift itself to accommodate other positions. This arrangement I resort to for the reason that considerable time and also considerable labor is saved by not disconnecting the draft animal each time the truck is swung from one position to the other.

The preferred embodiment of my invention is shown in the accompanying sheet of drawings, in which similar characters of reference designate corresponding parts, and in which.

Figures 1, 2, 3:
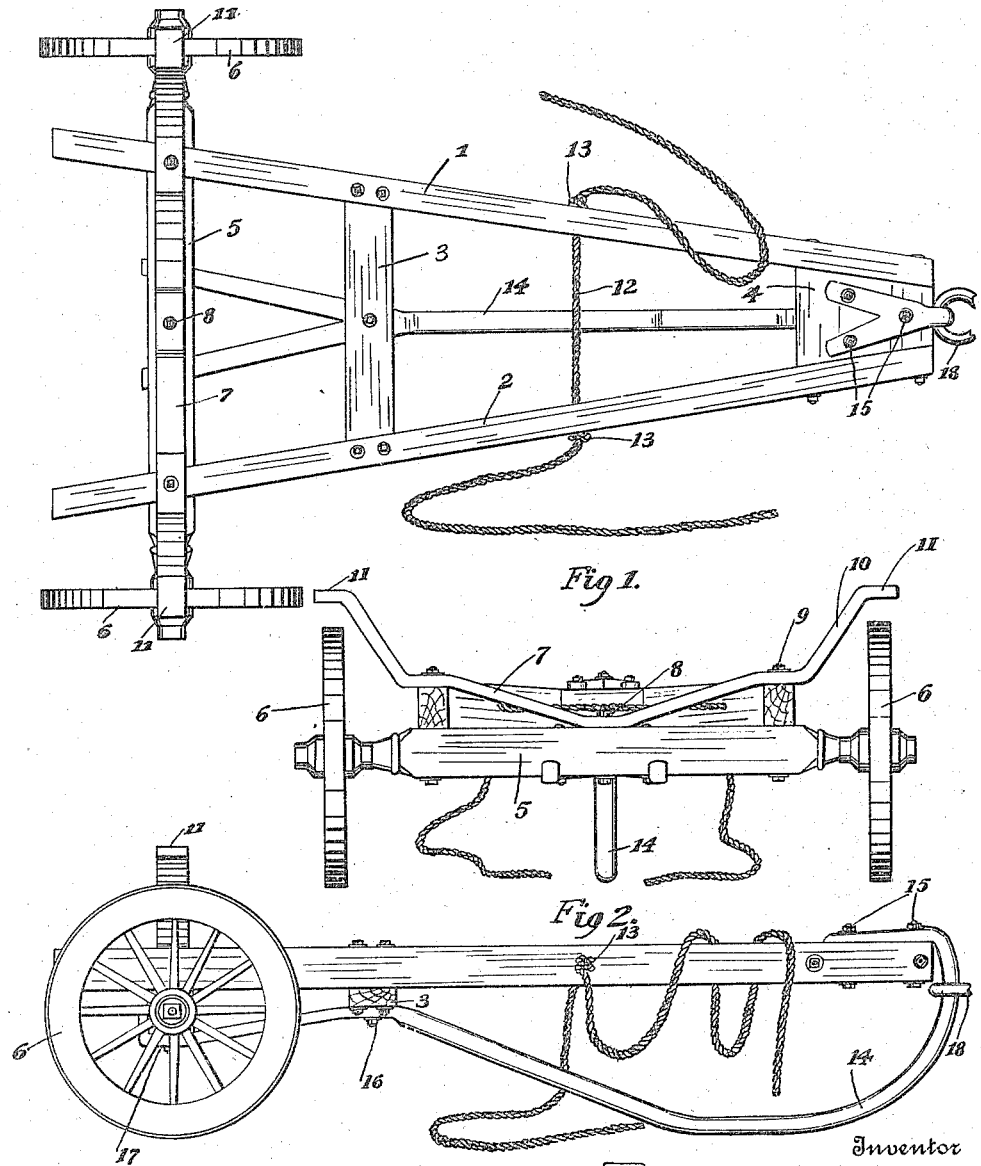
Figure 1 is a top plan view of my improved type of truck.
Fig. 2 is a rear view of the structure shown in Fig. 1.
Fig. 3 is a side elevation of the structure shown in Fig. 1.

My truck comprises a bed frame formed of members 1 and 2 united by cross pieces 3 and 4 and rigidly secured at their rear ends to the axle 5. The outer end of this axle rotatably carries wheels 6 in the usual manner. This axle 5 also supports a guard member 7 which is shaped to be centrally attached to the axle as is shown at 8 and then bent upwardly to a slight extent to be attached to the top side of the members 1 and 2 as shown at 9. From this point, the guard member is bent upwardly as is shown at 10 and its outer ends terminate in horizontal projections 11 disposed above the wheels 6. This guard member is provided to prevent whatever is being transported, from resting upon the wheels 6 and also to form a pocket for conveniently supporting the article being transported. After the article is in position, the rope 12 is passed around the same and the ends thereof are tied to securely hold it in position. This rope preferably passes through apertures in the frame pieces 1 and 2 and is then knotted as shown at 13 to prevent it from becoming lost.

The front end of the truck is provided with a runner 14 which is attached to the top side of the frame as is shown at 15 and then extends downwardly and rearwardly to be finally attached to the cross piece 3 and axle 5 as is shown at 16 and 17 respectively. The front portion of this runner is preferably rounded as is shown, to more easily ride any obstructions with which it may come in contact. Upon this runner rod there is mounted the draft attachment 18, which preferably takes the form of a ring or link as shown, this draft connection forming the connecting medium between the draft animal and the truck itself.

In use, the truck is moved to a point adjacent the article to be transported and its front end is then swung outwardly about the wheels 6, so that it assumes an upright position. This movement is permitted without unhitching the draft animal because of the rod 14, the link or ring 18 sliding back and forth thereon as the truck is elevated or lowered. After the truck is thus in an upright position, the ends of the rope 12 are securely fastened about the load and a pull by the draft animal will then cause the truck to swing to its lower or horizontal position, the rear end being supported by the wheels 6 and the front end by the runner 14.

What I claim, is:

1. A truck of the character described comprising a bed, a pair of wheels supporting the rear of said bed, a runner on said bed extending rearwardly from the front thereof, and a draft connection automatically adjustable back and forth on said runner as the truck is swung from horizontal to vertical position or vice versa.

2. A truck of the character described comprising a bed, a pair of wheels supporting the rear of said bed, a runner formed of a rod extending rearwardly from the front of said truck, and a draft connection slidably supported in connection with said rod to move back and forth thereon as the truck swings between upright and horizontal positions.

In testimony whereof I affix my signature in presence of two witnesses.

JOSEPH A. HEAD.

Witnesses:
W. H. HIGGINS,
ALBERT L. FREY.

Copies of this patent may be obtained for five cents each, by addressing the "Commissioner of Patents, Washington, D. C."